United States Patent Office 3,836,523
Patented Sept. 17, 1974

3,836,523
ONE-STEP SYNTHESIS OF CAPROLACTAM
John O. Turner, West Chester, Pa., assignor to Sun Research and Development Co., Philadelphia, Pa.
No Drawing. Filed Nov. 3, 1972, Ser. No. 303,563
Int. Cl. C07d 53/06
U.S. Cl. 260—239.3 A    6 Claims

ABSTRACT OF THE DISCLOSURE

Caprolactam and cyclohexanone may be prepared in one step by reacting cyclohexanol with $NH_3$ and $O_2$ in the presence of lithium chloride at elevated temperatures.

BACKGROUND OF THE INVENTION

This invention relates to a novel method for preparing caprolactam in one step from cyclohexanol.

The multi-step synthesis of caprolactam from cyclohexanol is known, in accordance with the following reaction scheme:

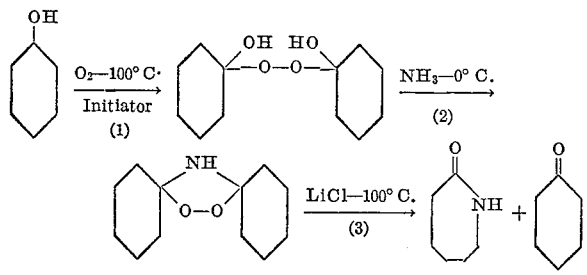

(1) Brown et al., J. Am. Chem. Soc., 77, 1756 (1955).
(2) Hawkins, J. Chem. Soc., 2663 (1969).
(3) Hawkins, U.S. Pat. No. 3,575,964.

SUMMARY OF THE INVENTION

It has now been found, in accordance with the present invention, that caprolactam, together with cyclohexanone, may be prepared in a single step at elevated temperatures, by contacting cyclohexanol with ammonia and oxygen in the presence of a salt of an element of Group I–A or II–A, in accordance with the following reaction:

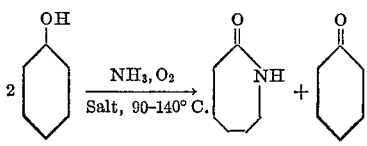

DESCRIPTION OF THE INVENTION

This process is conveniently carried out by contacting cyclohexanol with ammonia and oxygen or air at a temperature of from about 90 to 140° C., and preferably from about 100 to 125° C., wherein the flow rate of ammonia and oxygen are desirably at from about 1 to 25 liters per hour, but may each be varied outside these ranges depending upon the amount of starting material, the temperatures employed, the size of the reactor and the like.

The reaction is carried out in the presence of a metal salt catalyst of a metal of Group I–A or II–A of the Periodic Table, such as lithium, sodium, potassium or magnesium salts, or salts of the alkaline earth metals, e.g. calcium, barium and strontium. These salts may be halides or thiocyanates, and preferably is lithium chloride or bromide. When LiCl is employed, for example, the amount of catalyst should desirably be from about .05 to 5.0 grams per 70 cc. of cyclohexanol, and preferably from about 0.1 to 1.0 grams. In addition to the catalyst, there should also be used small amounts of a peroxide initiator such as methyl ethyl ketone, peroxide, benzoyl peroxide, or the like in amounts sufficient to initiate the reaction of the desired temperatures, e.g. in amounts of about 0.1 to 1.0 grams per 70 cc. of cyclohexanol.

The invention will now be illustrated by the following examples.

Example 1

Into a creased flask fitted with a Vibro-mixer for rapid stirring was added 70 cc. (63.8 grams) of cyclohexanol, 0.7 grams of MEK peroxide (initiator) and 0.1 gram of lithium chloride. The mixture was heated to 105° C. and the ammonia and oxygen were then added through dispersion tubes at rates of 7.6 liters/hour and 3.0 liters/hour, respectively.

The reaction was followed chromatographically at regular intervals. After 3 hours the gas chromatogram showed the presence of caprolactam.

Example 2

In accordance with the procedures of Example 1, but substituting calcium thiocyanate for lithium chloride, there is shown, after 4 hours, to be caprolactam present in the reaction mixture.

What is claimed is:

1. A process for the production of caprolactam which comprises contacting cyclohexanol with ammonia and oxygen or air in the presence of a metal salt catalyst and a peroxide initiator at a temperature of from about 90° to 140° C., wherein the metal is from Groups I–A or II–A of the Periodic Table.

2. The process according to Claim 1 wherein the catalyst is lithium chloride or lithium bromide.

3. The process according to Claim 1 wherein the temperature is from about 100 to 125° C.

4. The process according to Claim 1 wherein the ammonia and oxygen or air are each contacted with the cyclohexanol at flow rates of from about 1 to 25 liters per hour.

5. A process for the production of caprolactam which comprises contacting cyclohexanol with ammonia and oxygen or air in the presence of a Group I–A or II–A metal salt and a peroxide initiator at a temperature of from about 90 to 140° C., wherein the flow rate of said ammonia and oxygen or air are each from about 1 to 25 liters per hour.

6. The process according to Claim 5 wherein the metal salt is lithium chloride or lithium bromide.

References Cited

UNITED STATES PATENTS

| | | | |
|---|---|---|---|
| 3,575,964 | 4/1971 | Hawkins | 260—239.3 A |
| 3,576,817 | 4/1971 | Harris | 260—307 F |

OTHER REFERENCES

Brown et al., "J.A.C.S.," vol. 77, pp. 1756–1761 (1955).
Hawkins, "J. Chem. Soc." (1969), pp. 2663–2670.
Hawkins, "J. Chem. Soc." (1969), pp. 2691–2697.

HENRY R. JILES, Primary Examiner
R. T. BOND, Assistant Examiner

U.S. Cl. X.R.
260—307 F